United States Patent [19]
Nikaya et al.

[11] Patent Number: 5,534,579
[45] Date of Patent: Jul. 9, 1996

[54] HIGHLY WEATHER-RESISTANT, SINGLE PACKAGE, CROSSLINKABLE EMULSION

[75] Inventors: Toshiki Nikaya; Yoshifumi Fukushima, both of Suita; Teruo Kikuta, Nagaokakyo, all of Japan

[73] Assignee: Nippon Shokubai Co., Ltd., Osaka, Japan

[21] Appl. No.: 978,506

[22] Filed: Nov. 18, 1992

[30] Foreign Application Priority Data

Nov. 18, 1991 [JP] Japan .................................. 3-329929

[51] Int. Cl.$^6$ ........................................ C08F 2/16
[52] U.S. Cl. ................................ 524/460; 524/516
[58] Field of Search ................................... 524/460, 516

[56] References Cited

U.S. PATENT DOCUMENTS

| | | | |
|---|---|---|---|
| 4,427,819 | 1/1984 | Wessling et al. | 524/458 |
| 5,118,749 | 6/1992 | Knutson | 524/460 |
| 5,248,900 | 2/1994 | Izubayashi et al. | 524/460 X |

FOREIGN PATENT DOCUMENTS

| | | |
|---|---|---|
| 48-25049 | 4/1973 | Japan . |
| 54-21489 | 2/1979 | Japan . |
| 62-86010 | 4/1987 | Japan . |
| 63-258913 | 10/1988 | Japan . |
| 1-261409 | 10/1989 | Japan . |
| 3-128978 | 5/1991 | Japan . |

*Primary Examiner*—Judy M. Reddick
*Attorney, Agent, or Firm*—Oblon, Spivak, McClelland, Maier & Neustadt

[57] ABSTRACT

A highly weather-resistant, single package, cross-linkable emulsion using an emulsion polymer (X) obtained by emulsion polymerization, in an aqueous medium, of polymerizable monomer ingredients (II) comprising (a) from 0.1 to 10% by weight of a polymerizable UV-ray stable monomer, (b) from 5 to 99.4% by weight of cycloalkyl group-containing polymerizable monomer, (c) from 0.5 to 40% by weight of a polymerizable monomer which contains the groups having reactivity with carboxyl groups and (d) from 0 to 94.4% by weight of other polymerizable monomer, in which the amount of the polymerizable monomers (a), (b), (c) and (d) in total is 100% by weight, by using a water soluble or water dispersible polymer (I) having a terminal alkyl group with an acid value of 200 or greater obtained by polymerizing a polymerizable monomer ingredient (A) containing an unsaturated carboxylic acid as an essential ingredient under the presence of an alkyl mercaptan of 6 to 18 carbon atoms. This emulsion provides a highly weather-resistant, single package, crosslinkable emulsion capable of forming a coating layer which rapidly dries to cure at the initial stage of coating, exhibits long lasting excellent water proofness and weather-resistance, and further, having satisfactory gloss retainability, shape retainability, chemical resistance, solvent resistance and so on.

8 Claims, No Drawings

HIGHLY WEATHER-RESISTANT, SINGLE PACKAGE, CROSSLINKABLE EMULSION

BACKGROUND OF THE INVENTION

1. Field of the Invention

The present invention concerns a highly weather-resistant, single package, crosslinkable emulsion of excellent water proofness, weather-resistance and initial drying property. More particular, it provides a highly weather-resistant, single package, crosslinkable emulsion capable of forming a coating layer which rapidly dries to cure at the initial stage of coating, exhibits long lasting excellent water proofness and weather-resistance, and further, having satisfactory gloss retainability, shape retainability, chemical resistance, solvent resistance and so on.

2. Description of the Related Art

Emulsion type paint compositions have hitherto been produced by emulsion polymerization using various kinds of emulsifiers and have generally been used in the field of paints taking advantages of resulting in non-public pollution, good operability and of saving resources. However, since hydrophilic emulsifiers used for emulsion polymerization remain in the coating layer even after water is evaporated to form a coating film and tend to be localized at the boundary between each of original particles, this gives an undesired effect on various properties of the coating layer such as water proofness.

As a method of improving drawbacks in the emulsion type paint composition due to emulsifiers as described above, there have been proposed, for example, a soap free method of using a great amount of potassium persulfate or the like, a method of using a high molecular emulsifier and a method of using a reactive emulsifier having a polymerizable unsaturated group in the molecular structure but the water proofness is still insufficient. In view of the above, Japanese Patent Laid Open Sho 63-258913 (1988) discloses an invention for obtaining an aqueous resin dispersion of excellent water proofness by using an emulsifier containing an unsaturated carboxylic acid as the essential monomer ingredient and polymerized under the presence of a polymerization regulator, and polymerizing the polymerizable monomer ingredients containing the polymerizable monomer capable of reacting with carboxylic groups. According to this method, crosslinking reaction between the emulsifier and the aqueous resin proceeds upon evaporating water to form a coating film and the emulsifier is bonded and incorporated in the crosslinking structure, so that molecules of the emulsifier having the surface activity do not remain in the coating film and water proofness can be improved sufficiently. However, there still remains a problem for the initial drying property and long lasting weather-resistance is also insufficient.

In the paint composition, the weather-resistance is also an important physical property. In view of the water proofness, since acrylic or methacrylic [hereinafter collectively referred to as (meth)acrylic] resin is excellent compared with a vinyl ester resin or alkyd resin, the former has been generally used in the field of paints. However, the gloss retainability in an accelerated weather-resistance (a test using a Sunshine Weather-o-meter) is approximately 1000 hours at the most. Therefore, to improve the weather-resistance, it has been attempted to add a UV-absorber or to copolymerize a UV-absorbing monomer, but the long lasting stability is insufficient and yellowing or the like because of the UV-absorbing ingredient caused, although the weather-resistance can be improved to some extent.

Besides the (meth)acrylic resin, silicone and fluoro resins are listed as the resins which have excellent long lasting weather-resistance. However, they are poor in aesthetic feeling such as in gloss or shape retainability, or operability represented by pigment dispersibility, as well as the cost is expensive, so that their application has been restricted at present.

Accordingly, an object of the present invention is to improve the foregoing problems of the paint composition in the prior art. And it is an object thereof to provide a highly weather-resistant, single package, crosslinkable emulsion capable of forming a coating layer of excellent initial drying property and also having excellent physical properties such as water proofness, gloss, shape retainability and long lasting weather-resistance.

SUMMARY OF THE INVENTION

The highly weather-resistant, single package, crosslinkable emulsion according to the present invention has a feature in using an emulsion polymer (X) obtained by emulsion polymerization, in an aqueous medium, of polymerizable polymer ingredients (II) comprising (a) 0.1–10% by weight of a polymerizable UV-stable monomer, (b) 5–99.4% by weight of a cycloalkyl group-containing polymerizable monomers, (c) 0.5–40% by weight of a polymerizable monomer which contains a group having a reactivity with a carboxyl group and (d) 0–94.4% by weight of other polymerizable monomer, in which the amount of the polymerizable monomers (a), (b), (c) and (d) in total is 100% by weight, by using a water soluble or water dispersible polymer (I) having a terminal alkyl group with an acid value of 200 or greater obtained by polymerizing a polymerizable monomer ingredient (A) which contains an unsaturated carboxylic acid as the essential ingredient under the presence of an alkylmercaptan of 6 to 18 carbon atoms and/or a salt thereof as an emulsifier.

Further, the present invention also includes a highly weather-resistant, single package, crosslinkable emulsion using an emulsion polymer (XX) obtained by emulsion polymerization, in an aqueous medium, of polymerizable monomer ingredients (III) comprising (a) 0.1–10% by weight of a polymerizable UV-stable monomer, (b) 5–94.4% by weight of a cycloalkyl group-containing polymerizable monomer, (c) 0.5–40% by weight of a polymerizable monomer which contains a group having a reactivity with a carboxyl group, (e) 5–50% by weight of a polymerizable monomer having a saturated alkyl group of 12–18 carbon atoms and (d) 0–89.6% by weight of other polymerizable monomers, in which the amount of the polymerizable monomers (a), (b), (c), (d) and (e) in total is 100% by weight, by using the polymer (I) and/or a salt thereof as an emulsifier.

The present invention further includes a highly weather-resistant, single package, crosslinkable emulsion using an emulsion polymer (XXX) obtained by emulsion polymerization, in an aqueous medium, of the polymerizable monomer ingredients (III), by using a water soluble or water dispersible polymer (I') and/or a salt thereof as an emulsifier, having a terminal alkyl group with an acid value of 200 or greater obtained by polymerizing a polymerizable monomer ingredient (A') which contains an unsaturated carboxylic acid and a long-chained alkyl (meth)acrylate of 12 to 18 carbon atoms as the essential ingredient under the presence of an alkylmercaptan of 6 to 18 carbon atoms. In an embodiment, the preferred polymerizable monomer (e) having the saturated alkyl group of 12 to 18 carbon atoms is a long-chained (meth)acrylate of 12 to 18 carbon atoms.

DESCRIPTION OF THE PREFERRED EMBODIMENT

The present inventors at first conducted an experiment on a system of incorporating amines having a reaction promoting effect in order to improve the initial drying property of a curable aqueous resin dispersion as disclosed in Japanese Patent Laid-Open Sho 63-258913. However, it only led to a result that the water proofness and weather-resistance were worsened, as well as that the improvement for the initial drying property was scarcely observed. It is considered that this drawback is due to three causes, that is, amines are water soluble, the reaction promoting effect is not developed since amines of low boiling point evaporate in the course of forming the coating layer and amines of medium-high boiling point having a crosslinking promotion effect remain in the coating layer to result in the reduction of the water proofness and yellowing resistance. In view of the above, various studies have been made on other systems and it has been found that presence of a UV-stable monomer ingredient copolymerized for the improvement of the weather-resistance can outstandingly improve the initial drying property of the emulsion. Thus the present invention has been attained.

Specifically, the present invention succeeds in developing the following three effects simultaneously:

(1) The emulsifier used upon polymerization contributes to the proceeding of the crosslinking reaction in the course of forming the coating layer and is bonded with the polymer molecular chain that constitutes the coating layer and incorporated in the crosslinking structure, so that it does not remain in the coating layer as the molecules of the emulsifier having the surface activity and the water proofness can be improved.

(2) The long lasting weather-resistance can be attained by the presence of a specific UV-stable ingredient having a specific functional group.

(3) The specific UV-stable ingredient promotes the crosslinking reaction (1), and outstandingly improves the drying property in the course of forming the coating layer. In addition, since the UV-stable ingredient is present in the polymer, it does not result in the lowering of the water proofness as in the case of the amines.

However, it has been found in the further study that the coating film becomes hard to excess and brittle if the cyclohexyl group-containing polymerizable monomer is introduced too much in the emulsion for the improvement of the initial drying property and the weather-resistance. Therefore, it has been studied for the introduction of other ingredients into the emulsion to overcome the said problem. As a result, it has been found that a coating layer having an appropriate hardness can be obtained while maintaining the initial drying property and the weather-resistance at a high level, by introducing a monomer ingredient containing a saturated alkyl group of 12 to 18 carbon atoms. And it has also been found that use of a specific synthetic emulsifier is preferred when a monomer ingredient containing a saturated alkyl group of 12 to 18 carbon atoms is introduced.

Description will be made more in detail to the constituent ingredients of the present invention.

The polymer (I) used as the emulsifier upon polymerization of an emulsion in the present invention is a water soluble or water dispersible polymer and/or a salt thereof, having a terminal alkyl group with an acid value of 200 or greater obtained by polymerizing a polymerizable monomer ingredient (A) which contains an unsaturated carboxylic acid as an essential ingredient under the presence of an alkylmercaptan of 6 to 18 carbon atoms. It is essential that the polymer (I) have the acid value of 200 or greater in view of the stability upon emulsion polymerization and various physical properties of the resultant coating layer such as water proofness, solvent resistance and strength. If the acid value is less than 200, no sufficient emulsifying power can be obtained, so as to worsen the polymerization stability, which undesirably forms coagulation products during polymerization or deteriorates the storage stability. The molecular weight of the polymer (I) is from 300 to 7,000, more preferably, from 400 to 4,000. If the emulsifier with the molecular weight out of the above-mentioned range is used, no sufficient emulsion stability can be obtained.

The unsaturated carboxylic acid used for the synthesis of the polymer (I) is employed to introduce carboxylic groups into the polymer (I) thereby providing a hydrophilic property, as well as it is used as a functional group upon hardening the resultant highly weather-resistant, single package, crosslinkable emulsion. There is no particular restriction so long as it has a carboxylic group and/or a salt thereof and a polymerizable unsaturated group in the molecule and there can be mentioned, for example, (meth) acrylic acid, crotonic acid, maleic acid, fumaric acid, iraconic acid or a monoester thereof or a salt thereof. They may be used alone or as a mixture of two or more of them.

The polymerizable monomer ingredient (A) for synthesizing the polymer (I) may be composed only of the unsaturated carboxylic acid but other polymerizable monomers may also be used in combination if necessary. There is no particular restriction on the polymerizable monomer usable herein so long as it is copolymerizable with the unsaturated carboxylic acid and there can be mentioned, for example, styrene derivatives such as styrene, vinyl toluene, α-methylstyrene, chloromethylstyrene, styrene sulfonic acid and a salt thereof; (meth)acrylamide derivatives such as (meth) acrylamide, N-monomethyl(meth)acrylamide, N-monoethyl(meth)-acrylamide, N,N-dimethyl(meth)acrylamide; (meth)acrylic acid esters synthesized by an ester forming reaction of (meth)acrylic acid and $C_1$–$C_{18}$ alcohol such as methyl(meth)acrylate, ethyl(meth)acrylate and butyl-(meth)acrylate; hydroxyl group-containing (meth)acrylic acid esters such as 2-hydroxyethyl(meth)acrylate, 2-hydroxypropyl(meth)-acrylate, and esters of (meth)acrylic acid and polypropylene glycol or polyethylene glycol; 2-sulfonate ethyl(meth)acrylate and a salt thereof, vinyl sulfonic acid and a salt thereof, vinyl acetate and (meth)acrylonitrile. They may be used alone or as a mixture of two or more of them. Other polymerizable monomer than the unsaturated carboxylic acid is used in such an amount that the acid value of the resultant polymer (I) is not less than 200. And the kind and the amount are preferably selected while considering the compatibility with the polymer ingredient formed upon emulsion polymerization by using the resultant polymer (I).

It is preferred that the alkylmercaptan used in the present invention has 6 to 18 carbon atoms and there can be mentioned, for example, n-hexylmercaptan, n-octylmercaptan, n-dodecylmercaptan, t-dodecylmercaptan, cetylmercaptan and stearylmercaptan, and they may be used alone or as a mixture of two or more of them.

The alkylmercaptan, which is a molecular weight regulator upon polymerizing the polymerizable monomer ingredient (A), has a function of regulating the molecular weight of the resultant polymer (I) within a range from 300 to 7,000 and it is used for introducing an alkyl group to the terminal of the polymer (I), thereby providing a surface activity. An alkylmercaptan which has less than 6 carbon atoms is not usable because of the poor stability upon emulsion polymerization and during storage. The amount of the alkylmercaptan used is determined depending on the desired molecular weight of the polymer (I) and it is usually within a range from 2 to 300 parts by weight based on 100 parts by weight of the polymerizable monomer ingredient (A).

As a polymerization initiator used upon polymerizing the polymerizable monomer ingredient (A), well-known oil soluble or water soluble polymerization initiators can be used and the amount of using the polymerization initiator, for efficiently producing the polymer (I) having the terminal alkyl group, is preferably less than one mol, more preferably, less than 0.1 mol based on one mol of the alkylmercaptan.

The polymer (I) can be produced by any of the methods depending on the property thereof such as bulk polymerization, solution polymerization and suspension polymerization. Generally, the polymerization temperature is from 50° to 150° C. and the polymerization time is from 1 to 8 hours. There is no particular restriction on the solvent used for the solution polymerization so long as it dissolves the polymerizable monomer ingredient (A), the alkyl mercaptan and the radical polymerization initiator and does not inhibit the radical polymerization.

While the polymer (I) itself has a sufficient surface activity, it is preferred to use the polymer (I) as a salt thereof by partially or entirely neutralizing the carboxyl groups upon emulsion polymerization in order to improve the stability upon emulsion polymerization and obtain an emulsion of satisfactory storage stability.

Any of customary neutralizing agents can be used including, for example, alkali metal compounds such as sodium hydroxide and potassium hydroxide; alkaline earth metal compounds such as calcium hydroxide and calcium carbonate; ammonia; water soluble organic amines such as monomethylamine, dimethylamine, trimethylamine, monoethylamine, diethylamine, triethylamine, monopropylamine, dimethylpropylamine, monoethanolamine, diethanolamine, triethanolamine, ethylenediamine and diethylenetriamine. They may be used alone or as a mixture of two or more of them, being selected from the above-mentioned group.

In order to improve the water proofness of the hardened coating layer of the highly weather-resistant, single package, crosslinkable emulsion, it is preferred to use amines having a low boiling point which is capable of evaporating at an ambient temperature and such as ammonia, monomethylamine, dimethylamine and trimethylamine.

The polymer for the emulsifier (I) in the present invention is constituted as described above and it is preferred to use the polymer (I') as the emulsifier in a case of introducing the polymerizable ingredient (e) having a saturated alkyl group of 12 to 18 carbon atoms (to be described later) into the emulsion according to the present invention, because use of the polymer (I') as the emulsifier can complete the polymerization more stably without coagulation upon polymerization than in the case of using the polymer (I). The polymer (I') contains a long-chained (meth)acrylate of 12 to 18 carbon atoms together with the unsaturated carboxylic acid described above as the essential ingredient as the polymerizable monomer ingredient (A'), in which other conditions are identical with those for the polymer (I). Long-chained (meth)acrylate of 12 to 18 carbon atoms having either linear or branched ester substituent may be used and there can be mentioned, for example, dodecyl(meth)acrylate [lauryl(meth)acrylate], tridecyl(meth)acrylate, tetradecyl(meth)acrylate, pentadecyl(meth)acrylate, hexadecyl(meth)acrylate, heptadecyl(meth)acrylate, and octadecyl(meth)acrylate [stearyl(meth)acrylate]. They may be used alone or as a mixture of two or more of them. The long-chained (meth)acrylate of 12 to 18 carbon atoms is used generally by 5 to 300 parts by weight based on 100 parts by weight of the unsaturated carboxylic acid described above, while depending on the kind of the unsaturated carboxylic acid. It is, however, necessary that the acid value is 200 or greater.

Description will be made to each of the monomer ingredients to be polymerized by using the polymer (I) as the emulsifier [hereinafter referred to as the polymerizable monomer ingredients (II)].

At first, the polymerizable UV-stable monomer (a) is a compound which is essential in providing an excellent weather-resistance and improving the initial drying property of the emulsion polymer (X) in the present invention. Particularly, the monomer containing at least one sterically hindered piperidinyl group and a polymerizable unsaturated group in the molecule is used, in which a substance represented by the following general formula (1) is used most typically. The substance represented by the general formula (1) not only gives excellent weather-resistance and initial drying property to the emulsion copolymer (X) but also remarkably shows an effect of improving the dispersibility of various pigments such as carbon black and color mixing stability in a composite pigment system.

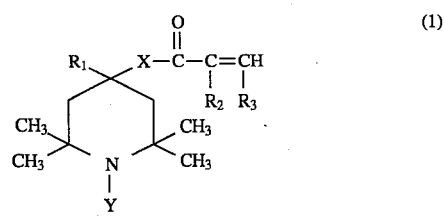

in which $R_1$ represents a hydrogen atom or cyano group, $R_2$ and $R_3$ each represent, independently, a hydrogen atom, or an alkyl group of 1 to 2 carbon atoms, X represents an imino group or oxygen atom, Y represents a hydrogen atom, an alkyl group of 1 to 18 carbon atoms or a group:

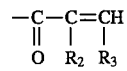

(in which $R_2$, $R_3$ have the same meanings as described above).

In the formula, an alkyl group of 1 to 2 carbon atoms represented by $R_2$ and $R_3$ is methyl or ethyl and an alkyl group of 1 to 18 carbon atoms represented by Y is a linear or branched hydrocarbon residue, typically represented by methyl, ethyl, propyl, isopropyl, butyl, isopropyl, tert-butyl, pentyl, hexyl, heptyl, octyl, nonyl, decyl, undecyl, dodecyl, tridecyl, tetradecyl, pentadecyl, hexadecyl, heptadecyl and octadecyl.

Description will be made more specifically referring to concrete compounds. As the polymerizable UV-stable monomer (a), there can be mentioned, for example, 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyl-4-crotonoyloxy-2,2,6,6-tetramethyl-piperidine, 4-crotonoylamino-2,2,6,6-tetramethylpiperidine and 1-crotonoyl-4-crotonoyloxy-2,2,6,6-tetramethyl-piperidine. They may be used alone or as a mixture of two or more of them.

The amount of the UV-stable monomer (a) used is from 0.1 to 10% by weight and, more preferably, from 0.2 to 8% by weight in the polymerizable monomer ingredient (II). If it is less than 0.1% by weight, it will possibly worsen not only the weather-resistance but also the initial drying property of the coating layer obtained by coating the resultant highly weather-resistant, single package, crosslinkable emulsion (hereinafter sometimes also referred to simply as a coating layer). If the amount of the monomer (a) used is more than 10% by weight, it is not preferred since the appearance is deteriorated due to the insufficient gloss and the shape retainability of the coating layer or the solvent resistance and the chemical resistance of the coating layer are worsened.

The cycloalkyl group-containing polymerizable monomer (b) is a constituent ingredient which is particularly useful for providing the coating layer obtained by coating the highly weather-resistant, single package, crosslinkable emulsion formed in the present invention with the long-lasting weather-resistance and aesthetic feeling such as gloss, water proofness and shape retainability, and those represented by the following general formula (2) show particularly preferred results.

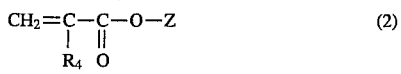

in which $R_4$ represents a hydrogen atom or an alkyl group of 1 or 2 carbon atoms and Z represents a cycloalkyl group which may have a substituent.

As the cycloalkyl group in the cyloalkyl group possibly having the substituent represented by Z there can be mentioned, for example, a monocyclic saturated hydrocarbon group such as cyclopentyl, cyclohexyl and cyclododecyl. The cyloalkyl group may have an alkyl substituent group of 1 to 6 carbon atoms which may include, for example, methyl, ethyl, propyl, isopropyl, butyl isobutyl, tert-butyl, pentyl, hexyl and heptyl.

Description will be made with reference to more concrete compounds. There can be mentioned, for example, cyclohexyl(meth)acrylate, methylcyclohexyl(meth)acrylate and tert-butylcyclohexyl(meth)acrylate and they can be used alone or as a mixture of two or more of them.

The amount of the cycloalkyl group-containing polymerizable monomer (b) used is from 5 to 99.4% by weight, more preferably, from 20 to 95% by weight in the polymerizable monomer ingredient (II). If the amount of the monomer (b) is less than 5% by weight, the weather-resistant, gloss, shape retainability and water proofness of the coating layer are poor. If it is used in excess of 99.4% by weight, the amount of the UV-stable monomer (a) and the polymerizable monomer (c) containing a group having reactivity with the carboxyl group to be described below becomes relatively insufficient, accordingly the water proofness, the initial drying property and the weather-resistance of the coating layer are worsened.

The polymerizable monomer (c) containing a group having reactivity with the carboxyl group used in the present invention can include, for example, epoxy group-containing polymerizable monomers such as glycidyl(meth)acrylate, 2-methylglycidyl(meth)acrylate and allyl glycidyl ether; aziridinyl group-containing polymerizable monomers such as (meth)acryloylaziridine, 2-aziridinylethyl(meth)acrylate;

oxazoline group-containing polymerizable monomers such as 2-isopropenyl-2-oxazoline and 2-vinyl-2-oxazoline. They may be used alone or as a mixture of two or more of them. The UV-stable monomer (a) promotes the crosslinking reaction between the carboxyl group in the polymer (I) used as the emulsifier and the polymerizable monomer (c). Since it especially promotes the reaction between the carboxyl group and the epoxy group, the epoxy group-containing polymerizable monomer is preferred as the monomer (c).

The amount of the polymerizable monomer (c) is suitably from 0.5 to 40%. by weight, preferably from 0.5 to 15% by weight in the polymerizable monomer ingredient (II). If the amount of use is less than 0.5% by weight, a portion of the carboxyl groups in the polymer (I) used as the emulsifier remain unreacted in a great amount and the crosslinking becomes insufficient, and the water proofness, initial drying property, solvent resistance and strength of the coating layer are deteriorated. If it is used in excess of 40% by weight, the stability upon emulsion polymerization and storage stability are deteriorated.

The highly weather-resistant, single package, crosslinkable emulsion according to the present invention, is obtained by emulsion polymerization of (a) one or more of polymerizable UV-stable monomers, (b) one or more of cycloalkyl group-containing polymerizable monomers and (c) one or more of polymerizable monomers containing group having reactivity with carboxyl groups as described specifically above. If desired, other polymerizable monomer (d) may also be added upon polymerization in accordance with the property desired for the coating layer formed by coating the highly weather-resistant, single package, crosslinkable emulsion.

As other polymerizable monomer (d) described above, there can be mentioned the polymerizable monomer ingredient (A) itself used for synthesizing the polymer (I), and in addition, for example, basic unsaturated monomers such as dimethylaminoethyl(meth)acrylate, dimethylaminoethyl-(meth)acrylamide, dimethylaminopropyl(meth)acrylamide, vinylpiridine, vinylimidazole and vinylpyrrolidone; polyfunctional (meth)acrylates having two or more polymerizable unsaturated groups in the molecules of esters, for example, of (meth)acrylic acid and a polyfunctional alcohol such as ethylene glycol, 1,3-butylene glycol, diethylene glycol, polyethylene glycol, polypropylene glycol, trimethylol propane, pentaerythritol and dipentaerythritol; (meth) acrylamides such as N-methylol(meth)acrylamide and N-butoxymethyl(meth)acrylamide; organic silicone group-containing unsaturated monomers such as vinyl trimethoxy silane, γ-(meth)acryloxypropyltrimethoxy silane, allyltrimethoxy silane and trimethoxysilylpropyl-allylamine; and vinyl fluoride, vinylidene fluoride, vinyl chloride, vinylidene chloride, divinyl benzene and diallyl-phthalate; as well as, acidic functional group-containing polymerizable monomer, for example, acidic phosphoric acid ester type polymerizable monomer such as 2-(meth)acryloyloxyethyl acid phosphate, 2-(meth)acryloyloxypropyl acid phosphate, 2-(meth)acryloyloxy-3-chloropropyl acid phosphate and 2-(meth)acryloyloxyethylphenyl phosphoric acid; and polymerizable UV- absorbing monomers such as 2-hydroxy-4-[3-(meth)acryloxy-2-hydroxypropoxy] benzophenone and 2,2'-dihydroxy-4-[3-(meth)acryloxy-2-hydroxypropoxy] benzophenone obtained by reacting 2,4-dihydroxybenzophenone or 2,2'-4-trihydroxybenzophenone and glycidyl (meth)acrylate. They may be used alone or as a mixture of two or more of them, being selected from the above-mentioned group.

The amount of the polymerizable monomer (d) used is suitably from 0 to 94.4% by weight in the polymerizable ingredient (II). If it is used in excess of 94.4% by weight, the amount of the polymerizable monomers (a), (b) and (c) as the essential ingredient in the highly weather-resistant, single package, crosslinkable emulsion in the present invention becomes relatively insufficient, so a coating film of excellent water proofness, initial drying property and weather-resistance can not be obtained. The amount of the polymerizable monomers (a), (b), (c) and (d) used in total is, of course, 100% by weight.

The other polymerizable monomer (d) is preferably selected so as not to damage the essential feature of the present invention. For instance, aromatic polymerizable monomers generally used in view of the gloss, water proofness, shape retainability, solvent resistance and chemical resistance give a negative effect in view of the long lasting weather-resistance as a feature of the highly weather resistant, single package, crosslinkable emulsion in the present invention. Accordingly, it is recommended that the monomer is used in an amount less than 20% by weight, preferably, less than 10% by weight and, more preferably, less than 5% by weight, in the polymerizable monomer ingredient (II). It is preferred to use the content of the methacrylic ester to greater than 50% by weight in order to develop the long lasting weather-resistance as the essential feature of the present invention more remarkably.

The methacrylic ester means herein those having a polymerizable unsaturated group derived from methacryloyl groups among the monomers comprising (a) polymerizable UV-stable monomer, (b) cycloalkyl group-containing polymerizable monomer, (c) a polymerizable monomer containing a group having reactivity with the carboxyl group and (d) other polymerizable monomer.

The basic type of the highly weather-resistant, single package, crosslinkable emulsion according to the present invention is produced by using a emulsion polymer (X) obtained by emulsion polymerization of (a) one or more of polymerizable UV-stable monomers, (b) one or more of cycloalkyl group-containing polymerizable monomers, (c) one or more of polymerizable monomers containing groups having reactivity with carboxylic groups and further (d) other polymerizable monomer if necessary as specifically described above, by using the polymer (I) and/or a salt thereof as the emulsifier.

If the amount of the cyclohexyl group-containing polymerizable monomer ingredient is increased too much for improving the initial drying property or the weather-resistance of the basic type highly weather-resistant, single package, crosslinkable emulsion, the coating layer sometimes becomes too hard and brittle, and accordingly, the monomer ingredient (e) containing the saturated alkyl group of 12 to 18 carbon atoms may be introduced in addition to the monomer (a)–(d), if it is necessary, depending on the application. The monomer ingredient (e) containing the saturated alkyl group of 12 to 18 carbon atoms is an ingredient having an effect of making the hardness of the coating layer appropriate while keeping the initial drying property and the weather-resistance at a high level. It has also been found that the water absorption ratio is reduced and the water repellency is remarkably improved for the coating layer by introducing the monomer ingredient (e) into the emulsion.

The monomer ingredient (e) containing the saturated alkyl group of 12 to 18 carbon atoms may include vinyl esters such as vinyl stearate or linear or branched olefins and, among them, long-chained (meth)acrylate of 12 to 18 carbon atoms exemplified previously as the polymer (I') for the emulsifier is preferably used.

When the monomer ingredient (e) containing the saturated alkyl group of 12 to 18 carbon atoms is introduced into the emulsion, the blending amount of the monomer ingredient (a)–(d), and (e) are preferably (a) from 0.1 to 10% by weight of the polymerizable UV-stable monomer, (b) from 5–94.4% by weight of the cycloalkyl group-containing polymerizable monomer, (c) from 0.5 to 40% by weight of the polymerizable monomer containing the group having reactivity with the carboxyl group, (e) from 5 to 50% by weight of the polymerizable monomer having alkyl group of 12 to 18 carbon atoms and (d) from 0–89.6% by weight of other polymerizable monomer, in which the amount of the polymerizable monomers (a), (b), (c), (d) and (e) in total is 100% by weight.

When the polymerizable monomer ingredients comprising (a)–(e) described above [hereinafter referred to as the polymerizable monomer ingredients (III)] are polymerized, the polymer (I') is preferably used as the emulsifier, because the amount of coagulation products formed during polymerization is reduced and the polymerization is completed more industrially stably by using the polymer (I') than the polymer (I) as the emulsifier when the polymerizable monomer ingredient (e) having the saturated alkyl group of 12 to 18 carbon atoms is emulsion polymerized together with other monomer ingredients. Polymerization of the monomer ingredients (III) is also possible by using the polymer (I) as the emulsifier. The coagulation product formed, if any, may be removed by known method such as filtration.

As a method of emulsion polymerization for producing the emulsion polymer (X) [or (XX) or (XXX)] by emulsion polymerization of the monomer ingredients (II) [or (III)] by using the polymer (I) [or (I')] and/or a salt thereof as the emulsifier in the present invention, any of known emulsion polymerization processes may be applied. For instance, there can be used a method of polymerization by collectively mixing a polymerization initiator, water, the polymer (I) [or (I')] and/or the salt for the emulsifier thereof and the polymerizable monomer (II) [or (III)], a so-called monomer dropping method and pre-emulsionmethod. It is also possible to obtain a hetero phase structure for the emulsion particles by conducting multi-stage polymerization such as seed polymerization, core-shell polymerization and power feed polymerization. The polymerization temperature is from 0° to 100°, preferably, 40° to 95° C. and the polymerization time is suitably from 1 to 10 hours. Upon emulsion polymerization, a hydrophilic solvent or addition of other known emulsifiers or additives may be allowed within a certain range not worsening the property of the coating layer of the present invention.

The amount of the polymer (I)[or (I')] for emulsifier and/or the salt thereof used is preferably within a range from 0.5 to 200 parts by weight more preferably, from 1 to 15 parts by weight based on 100 parts by weight of the polymerizable monomer ingredients (II) [or (Ill)]. The stability upon emulsion polymerization is poor if the amount of use is less than 0.5 parts by weight, whereas emulsion often gels undersirably during polymerization if it exceeds 200 parts by weight.

There is no particular restriction on the polymerization initiator and any of known initiators may be used. Considering the initial drying property and the water proofness of the coating layer, use of polymerization initiators not leaving sulfate groups such as hydrogen peroxide, di-t-butyl peroxide, peracetic acid, 2,2'-azobis(2-amidinopropane)dihydrogen chloride and 4,4'-azobis(4-cyanopentanic acid), alone or as a mixture of two or more of them, is preferred. More preferably, 2,2'-azobis(2-amidinopropane)dihydrogen chloride, 4,4'-azobis(4-cyanopentanic acid) or the like having amidino group, carboxyl group or the like having high reactivity with the functional group of the polymerizable monomer (c) is used. The amount of the polymerization initiator used is suitably from 0.01 to 5 parts by weight based on 100 parts by weight of the polymerizable monomer ingredients (II) [or (III)].

As the highly weather-resistant, single package, crosslinkable emulsion of the present invention, the emulsion polymer (X) [or (XX) or (XXX)] obtained in the above-mentioned procedures may be used as it is for the paint and, if necessary, it is also possible to blend known additives, for example, coalescent aid, pigment, filler, toner, wetting agent and antistatic agent.

As for the pigments, there can be mentioned, for example, inorganic pigment such as white pigment including titanium oxide, antimony trioxide, zinc powder, lithopon and lead white, colored pigment including carbon black, chrome yellow, molybdenum red, red iron oxide, yellow iron oxide and yellow powder or organic pigment including azo compound such a benzidine and hanza yellow and phthalocyanine such as phthalocyanine blue. They may be used alone or as a mixture of two or more of them.

Among the pigments described above, it is recommended to select a pigment of satisfactory weather-resistance so as not to reduce the weather-resistance of the coating layer. For instance, in view of the weather-resistance of the coating layer use of rutile type titanium oxide gives better effect than the use of anatase type titanium oxide. Moreover, in the rutile type, chlorine method titanium oxide is preferred to sulfuric acid titanium oxide in view of developing the long lasting weather-resistance.

EXAMPLE

To further illustrate this invention, and not by way of limitation, the following examples and comparative examples are given.

In the following examples, "parts" or "%" means parts by weight and % by weight respectively except otherwise specified.

Reference Example 1

(Preparation Method of Polymer (I))

To a separable flask equipped with a stirrer, a reflux condenser, a nitrogen introduction tube, a thermometer and a dropping funnel, 180 parts of isopropyl alcohol was charged, elevating the internal temperature to 81° C. and refluxed for 10 min while blowing nitrogen. Then, a polymerizable monomer mixture previously prepared comprising 174 parts of acrylic acid, 36 parts of n-dodecylmercaptan and 0.42 parts of 2,2'-azobisisobutyronitrile was dropped and polymerized for one hour. After the dropping was over, they were aged under reflux for one hour to obtain a solution of the polymer (I) of 53.9% solid content. The polymer (I) was a white powdery substance having the formula represented by the following general formula, an acid value of 645 and a number average molecular weight of 1200:

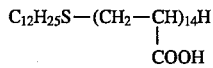

Reference Example [Preparation Method of Polymer (I')]

To a similar flask to that in Reference Example 1, 180 parts of isopropyl alcohol was charged, elevating the internal temperature to 81° C. and refluxed for 10 min while blowing nitrogen. Then, a polymerizable monomer mixture previously prepared comprising 142 parts of acrylic acid, 16.6 parts of lauryl dodecyl acrylate (mixture), 6.2 parts of styrene, 28 parts of n-dodecyl-mercaptan, 5.5 parts of methyl alcohol and 0.11 parts of 2,2'-azobisisobutyronitrile was dropped and polymerized for three hours. After the dropping was over, they were aged under reflux for one hour to obtain a solution of the polymer (I') of 50.6% solid content. The polymer (I') was a white viscous substance having the formula represented by the following general formula, an acid value of 474 and number average molecular weight of 1500.

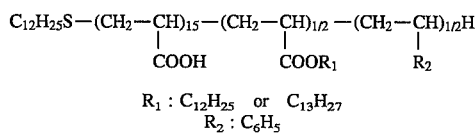

Comparative Reference Example 1

[Preparation Method of Polymer (I")]

To a similar flask to that in Reference Example 1, 180 parts of isopropyl alcohol was charged, elevating the internal temperature to 81° C. and refluxed for 10 min while blowing nitrogen. Then, a polymerizable monomer mixture previously prepared comprising 10 parts of acrylic acid, 120 parts of 2-hydroxyethyl methacrylate, 40 parts of methyl methacrylate, 20 parts of n-butyl acrylate, 10 parts of styrene, and 4 parts of 2,2'-azobisisobutyronitrile was dropped and polymerized for three hours. After the dropping was over, they were aged under reflux for one hour to obtain a solution of a polymer (I") of 52.9% sol id content. The polymer (I") was a white resinous substance having an acid value of 38 and a number average molecular weight of 7500.

Example 1

To a separable flask equipped with a stirrer, are flux condenser, a nitrogen introduction tube, a dropping funnel and a thermometer, 70.0 parts of purified water and 0.4 parts of a solution of the polymer (I) obtained in Reference Example 1 were charged, which were neutralized with the addition of 0.6 parts of 25% aqueous ammonia to form an emulsifier. The temperature was elevated to 65° C. with stirring while moderately blowing a nitrogen gas. Subsequently, a pre-emulsion mixture was formed by adding an aqueous solution of the emulsifier prepared by neutralizing 4.2 parts of a solution of the polymer (I) obtained in Reference Example 1 with the addition of 1.8 parts of 25% aqueous ammonia and 24.5 parts of distilled water to a polymerizable monomer ingredient comprising 0.3 parts of 4-methacryloyloxy-2,2,6,6-tetramethylpiperidine, 30.0 parts of cyclohexyl methacrylate, 20.0 parts of t-butylcyclohexyl methacrylate, 10.0 parts of methyl methacrylate, 35.7 parts of 2-ethylhexyl acrylate and 4.0 parts of glycidyl methacrylate, and then 10% of the mixture was dropped into the flask, and subsequently 4.0 parts of a 5% aqueous solution of 2,2'-azobis(2-amidinopropane)-dihydrogen chloride was added. After 10 min, the remaining pre-emulsion mixture was uniformly dropped over three hours. During dropping, the temperature was kept at 65°–70° C. After the dropping was over, the mixture was aged with stirring for one hour at that temperature, to obtain an emulsion of the copolymer (1) with the solid content of 50% and the viscosity of 2000 cps.

Examples 2–9

Emulsions of copolymers (2)–(9) were prepared in accordance with the procedure as described in Example 1, except for changing the kind and the amount of use of the polymer and the polymerizable monomer obtained in the reference example to those shown in Table 1 in Example 1.

Examples 10–12

Emulsions of copolymers (10)–(12) were prepared in accordance with the procedure as described in Example 1, except for changing the kind and the amount of use of the polymer and the polymerizable monomer obtained to those shown in Table 1 in Example 1. Coagulation products were observed to be formed but they could be filtered.

Examples 13–15

Emulsions of copolymers (13)–(15) were prepared in accordance with the procedure described in Example 1, except for using, instead of the polymer (I), the same amount of the solution of the polymer (I') obtained in Reference Example 2 and changing the kind and the amount of use of the polymerizable monomer as those shown in Table 1 in Example 1.

polymerizable monomer to those shown in Table 2 in Example 1.

Comparative Example 5

Emulsion copolymerization was conducted in accordance with the procedure as described in Example 1, except for changing the kind and the amount of use of the polymerizable monomer in Example 2 to those shown in Table 2. A great amount of coagulation products were formed in the latter half of the dropping in which the polymerization could no more be continued.

Comparative Example 6

Emulsion copolymerization was conducted in accordance with the procedure as described in Example 1, except for using, instead of using the polymer (I) in Example 1 the same amount of the solution of the comparative polymer (I") obtained in the comparative reference example. However, a great amount of coagulation products were formed in the latter half of the dropping in which the polymerization could no more be continued.

Comparative Example 7

To a separable flask equipped with a stirrer, a reflux condenser, a nitrogen introduction tube, a dropping funnel and a thermometer, 70.0 parts of distilled water, 1.5 parts of Nonipole 200 (manufactured by Sanyo Kasei Co.; polyoxyethylene nonylphenyl ether) and 0.3 parts of Newpole PE-68

TABLE 1

| Emulsion of copolymer | Example | | | | | | | | | | | | | | |
|---|---|---|---|---|---|---|---|---|---|---|---|---|---|---|---|
| | 1 (1) | 2 (2) | 3 (3) | 4 (4) | 5 (5) | 6 (6) | 7 (7) | 8 (8) | 9 (9) | 10 (10) | 11 (11) | 12 (12) | 13 (13) | 14 (14) | 15 (15) |
| 4-methacryloyloxy-2,2,6,6-tetramethyl piperidine | 0.3 | 4.0 | 4.0 | 3.0 | 1.0 | 4.0 | 1.0 | 1.0 | 2.0 | 2.0 | 1.0 | 1.0 | 2.0 | 1.0 | 1.0 |
| 4-methacryloyloxy-1,2,2,6,6-pentamethyl piperidine | — | — | 2.0 | — | 1.0 | — | 2.0 | 3.0 | 1.0 | — | — | — | — | — | — |
| 4-methacryloylamino-2,2,6,6,-tetramethyl piperidine | — | — | 2.0 | 1.0 | — | — | 2.0 | — | 2.0 | — | — | — | — | — | — |
| Cyclohexyl methacrylate | 30.0 | 50.0 | 60.0 | 20.0 | 50.0 | 55.0 | 40.0 | 50.0 | 40.0 | 35.0 | 35.0 | 20.0 | 35.0 | 35.0 | 20.0 |
| t-butylcyclohexyl methacrylate | 20.0 | 10.0 | — | — | 30.0 | — | 10.0 | — | 20.0 | — | — | — | — | — | — |
| Methylmethacrylate | 10.0 | — | — | 35.0 | — | — | — | 6.0 | — | 12.0 | 9.0 | 12.5 | 12.0 | 9.0 | 12.5 |
| Stylene | — | — | — | — | — | — | — | — | — | — | 9.0 | 12.5 | — | 9.0 | 12.5 |
| Dodecyl tridecyl acrylate (mixture) | — | — | — | — | — | — | — | — | — | 10.0 | 25.0 | 45.0 | 10.0 | 25.0 | 45.0 |
| Hydroxyethyl methacrylate | — | — | — | 5.0 | — | 5.5 | — | — | — | — | — | — | — | — | — |
| 2-ethylhexyl acrylate | 35.7 | 34.0 | 27.0 | 32.0 | 16.0 | 35.0 | 20.0 | 20.0 | 20.0 | 39.0 | 20.0 | 8.0 | 39.0 | 20.0 | 8.0 |
| n-butyl acrylate | — | — | — | — | — | — | 10.0 | 15.0 | 10.0 | — | — | — | — | — | — |
| Glycidyl methacrylate | 4.0 | 2.0 | 5.0 | 4.0 | 2.0 | 0.5 | 10.0 | 5.0 | 5.0 | 2.0 | 1.0 | 1.0 | 2.0 | 1.0 | 1.0 |
| 2-isopropenyl-2-oxazoline | — | — | — | — | — | — | 5.0 | — | — | — | — | — | — | — | — |
| Polymer (I) solution | 5.6 | 5.6 | 5.6 | 5.6 | 5.6 | 5.6 | 5.6 | 1.4 | 11.2 | 5.6 | 5.6 | 5.6 | — | — | — |
| Polymer (I') solution | — | — | — | — | — | — | — | — | — | — | — | — | 5.6 | 5.6 | 5.6 |
| Solid content (%) | 50 | 50 | 50 | 50 | 50 | 50 | 50 | 50 | 50 | 50 | 50 | 50 | 50 | 50 | 50 |
| Polymerization stability | good | good | good | good | good | good | good | good | good | Coagulation formed | Coagulation formed | Coagulation formed | good | good | good |

Comparative Examples 1–4

Emulsions of copolymers (1')–(4') were prepared in accordance with the procedure described in Example 1, except for changing the kind and the amount of use of the (manufactured by Sanyo Kasei Co.; polyoxyethylene glycol/polyoxypropylene glycol/polyoxyethylene glycol—triblock copolymer) were charged, and subsequently, temperature was elevated to 65° C. under stirring while moderately blowing a nitrogen gas. Subsequently, a pre-emulsion mixture was prepared by adding 3.0 parts of Nonipole 200, 0.8 parts of Newpole PE-68 and 27.5 parts of purified water to a polymerizable monomer ingredient comprising 2.0 parts of 4-methacryloyloxy-2,2,6,6-tetramethylpiperidine, 1.0 parts of 4-methacryloyloxy-1,2,2,6,6-pentamethylpiperidine, 30.0 parts of cyclohexyl methacrylate, 15.0 parts of t-butyl-cyclohexyl methacrylate, 10.0 parts of hydroxyethyl methacrylate, 25.0 parts of 2-ethylhexyl acrylate, 10.0 parts of n-butyl acrylate and 7.0 parts of glycidyl methacrylate, which was dropped over three hours. Meanwhile, 6.0 parts of an aqueous 5.0% solution of ammonium persulfate and an aqueous 5.0% solution of sodium hydrogen-sulfite was portionwise dropped into the flask on every 10 minutes till the dropping of the pre-emulsion was over. During dropping, the temperature was maintained at 65°–70° C., and after the dropping was over, aging was conducted at the same temperature for one hour with stirring, to obtain an emulsion of the copolymer (7') with the solid content of 50% and the viscosity of 1000 cps.

Comparative Example 8

Emulsion copolymerization was conducted in accordance with the procedure as described in Example 1, except for changing the kind and the amount of use of the polymerizable monomer obtained in Example 1 to those shown in Table 2. After the reaction was over, the content was cooled to 45° C. and 1.6 parts of diethylamine was added to prepare an emulsion of copolymer (8').

Comparative Example 9

Emulsion copolymerization was conducted in accordance with the procedure as described in Comparative Example 7, except for changing the kind and the amount of use of the polymerizable monomer obtained in comparative Example 7 to those shown in Table 2, to obtain an emulsion of copolymer (9').

Comparative Examples 10–11

Emulsions of copolymers (10')–(11') were prepared in accordance with the procedure as described in Example 1, except for changing the kind and the amount of use of the polymerizable monomer obtained in Example 1 to those shown in Table 2. In this case, since coagulation products were formed and a great amount of unreacted polymerizable monomer was observed in the emulsion of the copolymer (11'), it was no more usable.

Evaluation Method for Weather-Resistance

Emulsions of copolymers (1)–(15), (1')–(4') and (7')–(10') usable among those obtained Examples 1–15 and Comparative Examples 1–11 were used to prepare white paints of the following composition.

| | |
|---|---|
| Deionized water | 64.6 |
| Demole EP (manufactured by Kao Co.) | 2.0 |
| Nopko 8034 (manufacrtured by San Nopko Co.) | 0.3 |
| Titanium oxide (rutile type) | 60.0 |
| Aqueous copolymer emulsion | 146.7 |
| Butyl cellosolve | 15.0 |
| 5% Adekanol UH-420 | 1.0 |
| (manufactured by Asahi Denka Co.) | |
| Total | 284.1 (parts) |

The obtained paints were coated on a flexible board to a dry film coating thickness of about 80 μm. An accelerated weather-resistance test (using Sunshine Weather-o-meter) was conducted by using test pieces dried for seven days under the condition at 23° C., 65% RH. The results are shown in Table 3 and Table 4.

Evaluation Method for Initial Drying Property

Emulsions of copolymers (1)–(15), (1')–(4') and (7')–(10') usable among those obtained Examples 1–15 and Compara-

TABLE 2

| Emulsion of copolymer | Comparative Example | | | | | | | | | | |
|---|---|---|---|---|---|---|---|---|---|---|---|
| | 1 (1') | 2 (2') | 3 (3') | 4 (4') | 5 (5') | 6 (6') | 7 (7') | 8 (8') | 9 (9') | 10 (10') | 11 (11') |
| 4-methacryloyloxy-2,2,6,6-tetramethyl piperidine | — | 8.0 | 1.0 | 2.0 | 2.0 | 5.0 | 2.0 | — | — | 2.0 | 1.0 |
| 4-methacryloyloxy-1,2,2,6,6-pentamethyl piperidine | — | 3.0 | 1.0 | — | — | — | 1.0 | — | — | — | — |
| 4-methacryloylamino-2,2,6,6-tetramethyl piperidine | — | 4.0 | — | — | 2.0 | — | — | — | — | — | — |
| Cyclohexyl methacrylate | 50.0 | 60.0 | 2.0 | 35.0 | 10.0 | 55.0 | 20.0 | 30.0 | — | 40.0 | 10.0 |
| t-butylcyclohexyl methacrylate | 10.0 | — | — | 25.0 | 20.0 | — | 15.0 | 20.0 | — | — | — |
| Methylmethacrylate | — | — | 50.0 | — | — | — | 10.0 | 10.0 | 50.0 | 14.0 | 8.0 |
| Dodecyl tridecyl acrylate (mixture) | — | — | — | — | — | — | — | — | — | 2.0 | 80.0 |
| Hydroxyethyl methacrylate | — | 3.0 | 6.0 | — | — | 5.0 | 10.0 | — | 10.0 | — | — |
| 2-ethylhexyl acrylate | 30.0 | 20.0 | 25.0 | 38.0 | 10.0 | 30.0 | 10.0 | 15.0 | 10.0 | 40.0 | — |
| n-butyl acrylate | 5.0 | — | 10.0 | — | 10.0 | — | 25.0 | 20.0 | 30.0 | — | — |
| Glycidyl methacrylate | 5.0 | 2.0 | 5.0 | — | 41.0 | 5.0 | 7.0 | 5.0 | — | 2.0 | 1.0 |
| 2-isopropenyl-2-oxazoline | — | — | — | — | 5.0 | — | — | — | — | — | — |
| Polymer (I) solution | 5.6 | 5.6 | 5.6 | 5.6 | 5.6 | — | — | 5.6 | — | 5.6 | 5.6 |
| Comparative polymer (I") solution | — | — | — | — | — | 5.6 | — | — | — | — | — |
| Nonipole 200 | — | — | — | — | — | — | 4.5 | — | 4.5 | — | — |
| New pole PE-68 | — | — | — | — | — | — | 1.1 | — | 1.1 | — | — |
| Diethylamine | — | — | — | — | — | — | — | 1.6 | — | — | — |
| Solid content (%) | 50 | 50 | 50 | 50 | 50 | 50 | 50 | 50 | 50 | 50 | 45 |
| Polymerization stability | good | good | good | good | coagulate | coagulate | good | good | good | good | Coagulation formed | tive Examples 1–11 were used, and then 10.0 parts of butyl cellosolve (coalescent) was added to 100.0 parts by weight of each of the emulsions of the copolymers and coated by an applicator on a glass plate such that the film thickness after drying was about 30 μm. The test pieces were dried for 0 to three hours under the condition at 23° C., 65% RH, dipped into deionized water on every drying hour, and the redispersibility of the coating layer into water was determined to evaluate the drying property of the coating film. The results are also shown in Table 3 and Table 4.

Evaluation:

◎:no abnormality

○:scarce redispersion

△:partial redispersion

×:coating film remained scarcely

Evaluation Method for Contamination Resistance of Coating layer

The same white paint as prepared in the weather-resistance test was coated on a flexible board to a drying coated film thickness of about 80 μm. Test pieces dried for 0 to seven days under the conditions at 23° C., 65% RH were used, and the degree of contamination at the surface of the coating layer was tested by using carbon black on every drying hour. Evaluation for the degree of contamination was judged depending on the extent of coloration of the coating layer with carbon black. The results are also shown together in Table 3 and Table 4.

Evaluation:

◎:not contaminated

○:slightly tinted

△:tinted thinly but distinctly

×:tinted considerably

TABLE 3

| | | Accelerated weather-resistance | Initial drying property (redispersibility) | | | Dirt resistance (coating film drying property) | | | | |
|---|---|---|---|---|---|---|---|---|---|---|
| | Emulsion of copolymer | Gloss retention (%) | 30 (min) | 1 (hr.) | 3 (hr.) | 3 (hr.) | 1 (day) | 3 (day) | 5 (day) | 7 (day) |
| Example | | | | | | | | | | |
| 1 | (1) | 95< | ○~◎ | ◎ | ◎ | ○ | ◎ | ◎ | ◎ | ◎ |
| 2 | (2) | 95< | ○ | ○~◎ | ◎ | ○ | ◎ | ◎ | ◎ | ◎ |
| 3 | (3) | 95< | ○ | ◎ | ◎ | ○ | ○~◎ | ◎ | ◎ | ◎ |
| 4 | (4) | 95< | ○ | ○ | ◎ | ○ | ○~◎ | ◎ | ◎ | ◎ |
| 5 | (5) | 95< | ○ | ○~◎ | ◎ | ○ | ◎ | ◎ | ◎ | ◎ |
| 6 | (6) | 95< | ○ | ○~◎ | ◎ | ○ | ◎ | ◎ | ◎ | ◎ |
| 7 | (7) | 95< | ○~◎ | ◎ | ◎ | ○ | ○ | ◎ | ◎ | ◎ |
| 8 | (8) | 95< | ○ | ◎ | ◎ | ○~◎ | ◎ | ◎ | ◎ | ◎ |
| 9 | (9) | 95< | ○ | ○ | ◎ | ○ | ○~◎ | ◎ | ◎ | ◎ |
| 10 | (10) | 95< | ○ | ○~◎ | ◎ | ○ | ○~◎ | ◎ | ◎ | ◎ |
| 11 | (11) | 95< | ○ | ◎ | ◎ | ○ | ◎ | ◎ | ◎ | ◎ |
| 12 | (12) | 95< | ○ | ○~◎ | ◎ | ○ | ○~◎ | ◎ | ◎ | ◎ |
| 13 | (13) | 95< | ○ | ◎ | ◎ | ○~◎ | ◎ | ◎ | ◎ | ◎ |
| 14 | (14) | 95< | ○~◎ | ◎ | ◎ | ○ | ◎ | ◎ | ◎ | ◎ |
| 15 | (15) | 95< | ○ | ◎ | ◎ | ○ | ◎ | ◎ | ◎ | ◎ |

TABLE 4

| | Emulsion of copolymer | Accelerated weather-resistance Gloss retention (%) | Initial drying property (redispersibility) | | | Dirt resistance (coating film drying property) | | | | |
|---|---|---|---|---|---|---|---|---|---|---|
| | | | 30 (min) | 1 (hr.) | 3 (hr.) | 3 (hr.) | 1 (day) | 3 (day) | 5 (day) | 7 (day) |
| Comparative Example | | | | | | | | | | |
| 1 | (1') | 55 | △~○ | ○ | ⊚ | △ | ○ | ⊚ | ⊚ | ⊚ |
| 2 | (2') | 70 | △ | ○ | ⊚ | △ | △~○ | ⊚ | ⊚ | ⊚ |
| 3 | (3') | 60 | △ | △~○ | ○~⊚ | △ | ○ | ○~⊚ | ⊚ | ⊚ |
| 4 | (4') | 95< | ×~△ | △ | ○ | × | ×~△ | △ | ○ | ⊚ |
| 7 | (7') | 95< | × | △ | ○ | × | × | △~○ | ○ | ⊚ |
| 8 | (8') | 40 | △ | ○ | ⊚ | △ | ○ | ○~⊚ | ⊚ | ⊚ |
| 9 | (9') | 20 | × | ×~△ | △ | × | × | ×~△ | △~○ | ○~⊚ |
| 10 | (10') | 95< | ○~⊚ | ○~⊚ | ⊚ | ○~⊚ | ⊚ | ⊚ | ⊚ | ⊚ |

Test Method for Water Whitening Resistance

In the same manner for the evaluation of the initial drying property, test pieces dried for one day and seven days were used and dipped in distilled water at 23° C. for three days and the whiteness of the coating layer was visually observed. The results are shown in Table 5 and Table 6.

Evaluation:
⊚: no abnormality
○: slightly tinted with fluorescent color
△: blue white fluorescent color for the entire piece
×: whitened Test Method for Warm Water Whitening Resistance Test pieces were prepared in the same manner as for the evaluation for the water whitening resistance, dipped in warm water at 60° C. for one day and the whiteness of the coating layer was visually observed. The evaluation criteria were identical with those for the water whitening resistance. The results are also shown in Table 5 and Table 6.

Test method for Water Absorption and Water Leaching Ratio

Test pieces were prepared by adding the coalescent casting the same on a Teflon plate to a film thickness of about 100 μm after drying and then drying for one day and seven days under the condition at 23° C., 65% RH in the same procedure as that in the evaluation for the initial stage drying property. At first, the test piece was cut into about 20 mm square and weighted ($W_0$). Then, the test piece was immersed in deionized water for three days, pulled up, lightly wiped off the moisture on the surface and then weighted ($W_1$). Then the test piece was dried at 110° C. for one hour, allowed to cool and then weighted ($W_2$).

The water absorption ratio and the leaching ratio were determined in accordance with the following calculation formula. The results are also shown in Table 5 and Table 6.

Water absorption ratio (%)=$100 \times (W_1-W_0)/W_0$

Leaching ratio (%)=$100 \times (W_0-W_2)/W_0$

TABLE 5

| | Emulsion of copolymer | Water whitening resistance | | Warm water whitening resistance | | Water absorption (%) | | Leaching rate (%) | |
|---|---|---|---|---|---|---|---|---|---|
| | | 1 (day) | 7 (day) | 3 (hr.) | 1 (day) | 1 (day) | 7 (day) | 1 (day) | 7 (day) |
| Example | | | | | | | | | |
| 1 | (1) | ○~⊚ | ○~⊚ | ○~⊚ | ⊚ | 4.7 | 4.5 | 0.1 | 0.1 |
| 2 | (2) | ⊚ | ⊚ | ⊚ | ⊚ | 4.6 | 3.8 | 0.1 | 0.2 |
| 3 | (3) | ○~⊚ | ⊚ | ○ | ○ | 5.0 | 4.6 | 0.2 | 0.2 |
| 4 | (4) | ⊚ | ⊚ | ○~⊚ | ○~⊚ | 5.2 | 4.2 | 0.2 | 0.1 |
| 5 | (5) | ○~⊚ | ○~⊚ | ⊚ | ⊚ | 4.5 | 4.8 | 0.1 | 0.2 |
| 6 | (6) | ⊚ | ⊚ | ○ | ○ | 4.8 | 4.0 | 0.1 | 0.1 |
| 7 | (7) | ⊚ | ⊚ | ○~⊚ | ⊚ | 4.0 | 4.2 | 0.1 | 0.1 |
| 8 | (8) | ○~⊚ | ⊚ | ○ | ○~⊚ | 3.8 | 4.4 | 0.2 | 0.1 |
| 9 | (9) | ○~⊚ | ○~⊚ | ○ | ○~⊚ | 3.3 | 4.0 | 0.2 | 0.2 |
| 10 | (10) | ○~⊚ | ○~⊚ | ○~⊚ | ○~⊚ | 3.8 | 4.2 | 0.1 | 0.2 |
| 11 | (11) | ⊚ | ⊚ | ○ | ○~⊚ | 3.2 | 3.6 | 0.2 | 0.2 |
| 12 | (12) | ○~⊚ | ⊚ | ⊚ | ⊚ | 3.0 | 3.4 | 0.2 | 0.2 |
| 13 | (13) | ⊚ | ⊚ | ○~⊚ | ⊚ | 3.4 | 3.9 | 0.1 | 0.2 |
| 14 | (14) | ○~⊚ | ⊚ | ⊚ | ⊚ | 3.4 | 3.8 | 0.2 | 0.2 |
| 15 | (15) | ⊚ | ⊚ | ⊚ | ⊚ | 3.0 | 3.5 | 0.1 | 0.1 |

TABLE 6

| Emulsion of copolymer | Water whitening resistance 1 (day) | Water whitening resistance 7 (day) | Warm water whitening resistance 3 (hr.) | Warm water whitening resistance 1 (day) | Water absorption (%) 1 (day) | Water absorption (%) 7 (day) | Leaching rate (%) 1 (day) | Leaching rate (%) 7 (day) |
|---|---|---|---|---|---|---|---|---|
| Comparative Example | | | | | | | | |
| 1  (1')  | ⊚ | ⊚ | ○ | ⊚ | 4.6 | 3.6 | 0.3 | 0.2 |
| 2  (2')  | ○ | ○ | Δ | Δ~○ | 5.8 | 4.9 | 0.3 | 0.3 |
| 3  (3')  | ○ | ⊚ | ○ | ○~⊚ | 5.2 | 4.8 | 0.4 | 0.1 |
| 4  (4')  | X~Δ | X~Δ | X | X | 31.8 | 26.9 | 3.3 | 3.1 |
| 7  (7')  | X | X~Δ | X | X | 15.2 | 13.9 | 2.2 | 2.4 |
| 8  (8')  | ○ | ⊚ | Δ~○ | ○~⊚ | 8.8 | 8.8 | 1.3 | 0.8 |
| 9  (9')  | X | X~Δ | X | X | 18.1 | 15.5 | 3.9 | 3.3 |
| 10 (10') | ○~⊚ | ⊚ | ⊚ | ⊚ | 3.8 | 4.3 | 0.2 | 0.2 |

Evaluation Method for Water Repellency

Butyl cellosolve (coalescent) was added by 10.0 parts based on 100.0 parts of each of usable emulsions of copolymers (1)–(11), (1')–(4') and (7')–(10') among those obtained in Examples 1–15 and Comparative Examples 1–11 and they were coated by an applicator on a glass plate to a coating thickness after drying of about 30 μm. Test pieces were prepared by drying and forming a film at 100° C. for 10 min, and a contact angle at the surface of the coating layer was measured. The contact angle was measured by using an automatic contact angle meter CA-Z type (manufactured by Erma Co.) using a gage pointer (0.7 mm outer diameter, 0.4 mm inner diameter). After immersing the test piece in deionized water at 23° C. for three hours, it was dried for one day under the condition at 23° C., 65% RH, and the contact angle was measured in the same manner. The results are also shown in Table 7 and Table 8.

Evaluation Method for Shock Resistance

The coalescent was added and the emulsion was coated by an applicator on a steel plate to a film thickness after drying of about 100 μm. A test piece was prepared by drying for three days and the conditions at 23° C., 65% RH, and the shock resistance was evaluated by a Dupont type drop shock test using dropping bodies of 1 kg and 500 g each having a top end diameter of ½ inch. The results are also shown in Table 7 and Table 8.

Evaluation:

○: no abnormality

Δ: fine crack formed on the coating layer x: coating layer caused cracking and peeling

TABLE 7

| Emulsion of copolymer | Contact angle Before water immersion | Contact angle After water immersion | Shock resistance (1 kg: ½ inch dia.) 50 cm | 40 cm | 30 cm | Shock resistance (500 g: ½ inch dia.) 50 cm | 40 cm | 30 cm |
|---|---|---|---|---|---|---|---|---|
| Example | | | | | | | | |
| 1  (1)  | 78 | 82 | X | X | X | X | X | Δ |
| 2  (2)  | 80 | 83 | X | X | X | X | X | Δ |
| 3  (3)  | 78 | 80 | X | X | X | X | X | Δ |
| 4  (4)  | 75 | 78 | X | Δ | ○ | ○ | ○ | ○ |
| 5  (5)  | 77 | 79 | X | X | X | X | X | Δ |
| 6  (6)  | 80 | 82 | X | X | X | X | X | Δ |
| 7  (7)  | 76 | 80 | X | X | X | Δ | ○ | ○ |
| 8  (8)  | 75 | 79 | X | X | X | X | X | Δ |
| 9  (9)  | 76 | 78 | X | X | X | X | X | Δ |
| 10 (10) | 84 | 92 | Δ | ○ | ○ | ○ | ○ | ○ |
| 11 (11) | 86 | 97 | ○ | ○ | ○ | ○ | ○ | ○ |
| 12 (12) | 88 | 98 | ○ | ○ | ○ | ○ | ○ | ○ |
| 13 (13) | 84 | 93 | ○ | ○ | ○ | ○ | ○ | ○ |
| 14 (14) | 86 | 96 | ○ | ○ | ○ | ○ | ○ | ○ |
| 15 (15) | 87 | 98 | ○ | ○ | ○ | ○ | ○ | ○ |

TABLE 8

| Comparative Example | Emulsion of copolymer | Contact angle | | Shock resistance (1 kg: ½ inch dia.) | | | Shock resistance (500 g: ½ inch dia.) | | |
|---|---|---|---|---|---|---|---|---|---|
| | | Before water immersion | After water immersion | 50 cm | 40 cm | 30 cm | 50 cm | 40 cm | 30 cm |
| 1 | (1') | 77 | 81 | X | X | X | X | X | Δ |
| 2 | (2') | 76 | 79 | X | X | X | X | X | Δ |
| 3 | (3') | 73 | 75 | O | O | O | O | O | O |
| 4 | (4') | 78 | 80 | X | X | X | X | X | Δ |
| 7 | (7') | 73 | 74 | X | X | Δ | O | O | O |
| 8 | (8') | 75 | 77 | X | X | X | X | X | Δ |
| 9 | (9') | 76 | 79 | O | O | O | O | O | O |
| 10 | (10') | 79 | 84 | X | X | Δ | O | O | O |

Effect of the Invention

Since the highly weather-resistant, single package, crosslinkable emulsion according to the present invention is obtained by emulsion polymerization of polymerizable monomer ingredients of a specific composition under the presence of a specific emulsifier, a coating layer of excellent water proofness, initial stage drying property and long lasting weather-resistance, as well as having satisfactory gloss retainability, cracking resistance, blister resistance and yellowing resistance can be obtained. In addition, since the emulsion is also excellent in the pigment dispersibility, known organic or inorganic paint can be dispersed in the same by means of a conventional pigment dispersion method to formulate a pigmented paint.

The highly weather-resistant, single package, crosslinkable emulsion according to the present invention is capable of forming a coating layer of excellent gloss, shape retainability and solvent resistance and has excellent operability in addition to the above-mentioned effect and it can be used for wide application uses such as electric and electronic household appliances, steel equipments, large-scaled structures, automobiles, building, building material or woodwork.

We claim:

1. A highly weather-resistant, single package, emulsion comprising an emulsion polymer synthesized by polymerizing, in an aqueous medium, an emulsion comprising polymerizable monomer ingredients:

(a) 0.3% to 10% by weight, of a polymerizable UV-ray stable monomer, (b) 5% to 99.4% by weight, of a cycloalkyl group-containing polymerizable monomer, (c) 0.5% to 40% by weight, of a polymerizable monomer which contains groups having reactivity with carboxyl groups, and (d) 0% to 94.4% by weight, of other polymerizable monomers, wherein the sum of the weight % of said polymerizable monomers (a), (b), (c) and (d) is 100%, wherein said polymerization takes place in the presence of a water soluble or water dispersible polymer, having a terminal alkyl group, and an acid value of 200 or greater, wherein said water soluble or water dispersible polymer is obtained by polymerizing a monomer mixture comprising an unsaturated carboxylic acid, or a salt thereof, in the presence of a $C_{6-18}$ alkyl mercaptan, wherein said polymerizable UV-ray stable monomer is a monomer of the formula (1):

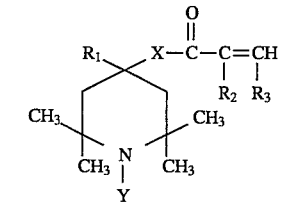

(1)

wherein Y represents a hydrogen atom, or an alkyl group of 1 to 18 carbon atoms, $R_1$ represents a hydrogen atom, $R_2$ and $R_3$ each represent, independently, a hydrogen atom or an alkyl group of 1 or 2 carbon atoms, and X represents an imino group or an oxygen atom.

2. The highly weather-resistant, single package, emulsion according to claim 1, wherein said cycloalkyl group-containing polymerizable monomer is

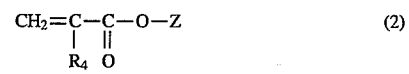

(2)

wherein $R_4$, represents a hydrogen atom or an alkyl group of 1 or 2 carbon atoms and Z represents a cycloalkyl group, or a $C_{1-6}$ alkyl substituted cycloalkyl group.

3. The highly weather-resistant, single package, emulsion of claim 2, wherein said cycloalkyl group-containing polymerizable monomer is selected from the group consisting of cyclohexyl(meth)acrylate, methylcyclohexyl(meth)acrylate, tert-butylcyclohexyl(meth)acrylate, and a mixture thereof.

4. The highly weather-resistant, single package, emulsion according to claim 1, wherein said polymerizable monomer which contains groups having reactivity with carboxyl groups is selected from the group consisting of epoxy group-containing polymerizable monomers, aziridinyl group-containing polymerizable monomers, oxazoline group-containing polymerizable monomers, and a mixture thereof.

5. The highly weather-resistant, single package, emulsion of claim 4, wherein said polymerizable monomer which contains groups having reactivity with carboxyl groups is selected from the group consisting of glycidyl(meth)acrylate, 2-methylglycidyl(meth)acrylate, allyl glycidyl ether, (meth)acryloylaziridine, 2-aziridinylethyl(meth)acrylate, 2-isopropenyl-2-oxazoline, 2-vinyl-2-oxazoline, and a mixture thereof.

6. The highly weather-resistant, single package, emulsion according to claim 1, wherein said other polymerizable monomers are selected from the group consisting of unsaturated carboxylic acids, styrene derivatives, (meth)acrylic acid esters, hydroxyl group-containing (meth)acrylic acid esters, basic unsaturated monomers, polyfunctional (meth)acrylates with two or more polymerizable unsaturated groups, (meth)acrylamides, organic silicone group-containing unsaturated monomers, acidic phosphoric acid ester polymerizable monomers, vinyl halides, vinylidene halides, divinylbenzene, diallyl-phthalate, salts thereof, and a mixture thereof.

7. The highly weather-resistant, single package, emulsion according to claim 1, wherein said unsaturated carboxylic acid, or salt thereof, is selected from the group consisting of (meth)acrylic acid, crotonic acid, maleic acid, fumaric acid, itaconic acid, monoesters of maleic acid, monoesters of fumaric acid, monoesters of itaconic acid, salts of (meth)acrylic acid, salts of crotonic acid, salts of maleic acid, salts of fumaric acid, salts of itaconic acid, and a mixture thereof.

8. The highly weather-resistant, single package, emulsion according to claim 1, wherein said $C_{6-18}$ alkylmercaptan is selected from the group consisting of n-hexylmercaptan, n-octylmercaptan, n-dodecylmercaptan, t-dodecylmercaptan, cetylmercaptan, stearylmercaptan, and a mixture thereof.

\* \* \* \* \*